Aug. 27, 1935.  H. P. WICKERSHAM ET AL  2,012,329
SLIP
Filed Jan. 7, 1935   2 Sheets-Sheet 1
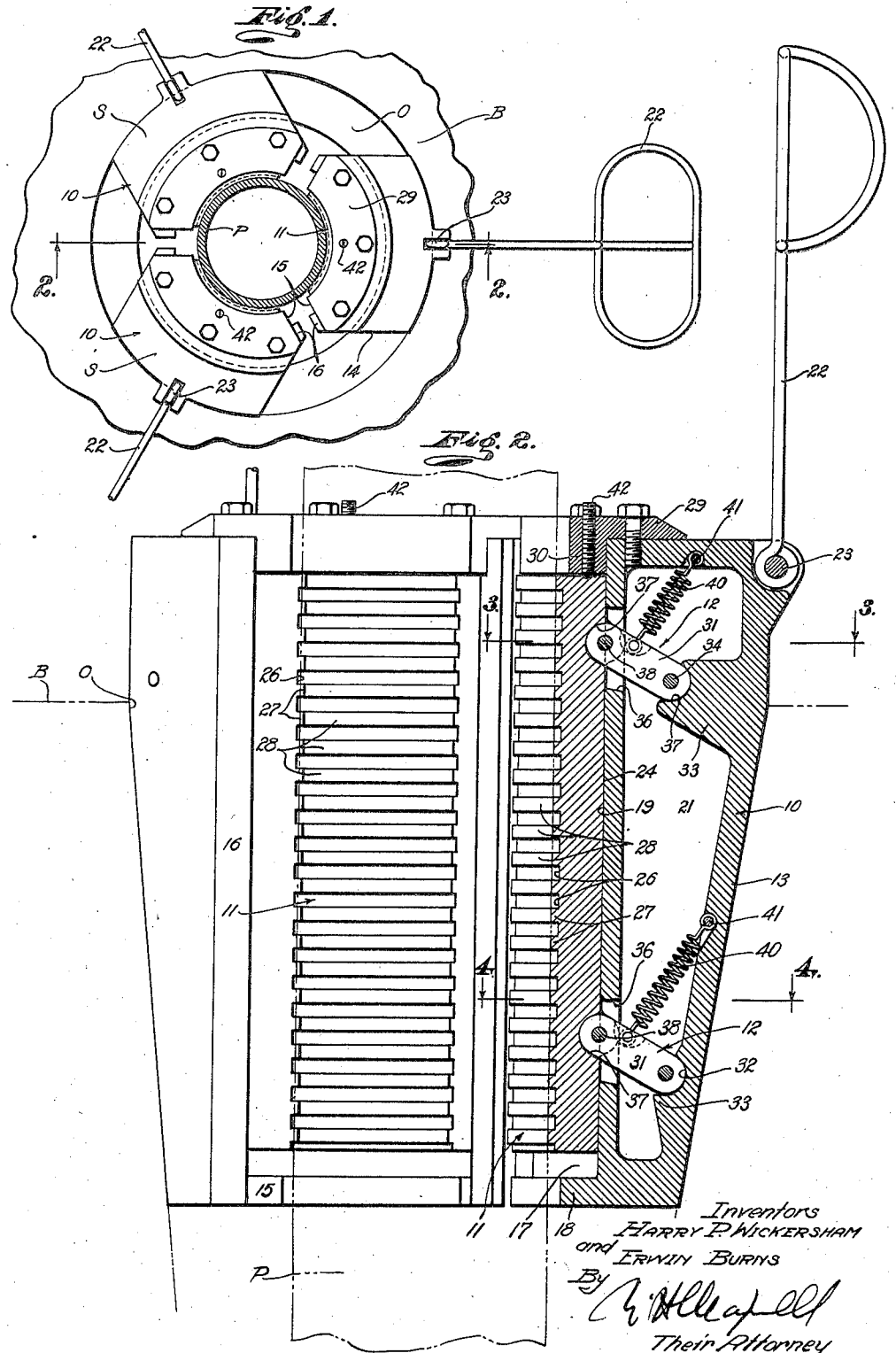
Inventors
Harry P. Wickersham
and Erwin Burns
By
Their Attorney Patented Aug. 27, 1935

2,012,329

UNITED STATES PATENT OFFICE 2,012,329

SLIP

Harry P. Wickersham, Huntington Park, and Erwin Burns, Los Angeles, Calif.

Application January 7, 1935, Serial No. 666

15 Claims. (Cl. 24—263)

This invention relates to well drilling equipment and relates more particularly to slips for use in the rotary table of a well drilling rig. A general object of the invention is to provide simple, practical, and effective slips of the character referred to.

Another object of the invention is to provide a slip for use in a rotary table that is very positive and dependable in gripping and supporting a pipe or the like.

Another object of the invention is to provide a slip of the character mentioned that embodies a toggle actuated liner or pipe engaging element that is automatically moved inwardly to grip the pipe with great force upon assuming the weight or a portion of the weight of the pipe and that is automatically freed from the pipe when the pipe is raised to allow the easy removal of the slip from the rotary table bushing.

Another object of the invention is to provide a slip of the character mentioned that is operable to grip a pipe or like object with great force without cutting or otherwise injuring the pipe. The pipe gripping member embodied in the invention is adapted to be forced inwardly against the pipe by the toggle means with great force and, therefore, may have parts of substantial area which are effective in gripping and holding the pipe. The large broad or blunt pipe engaging parts of the toggle actuated member do not cut into or injure the pipe as do the sharpened teeth of the slips now in general use.

A further object of the invention is to provide a slip of the character mentioned that may be adjusted to properly and effectively handle or grip pipe of various diameters.

Figure 3:
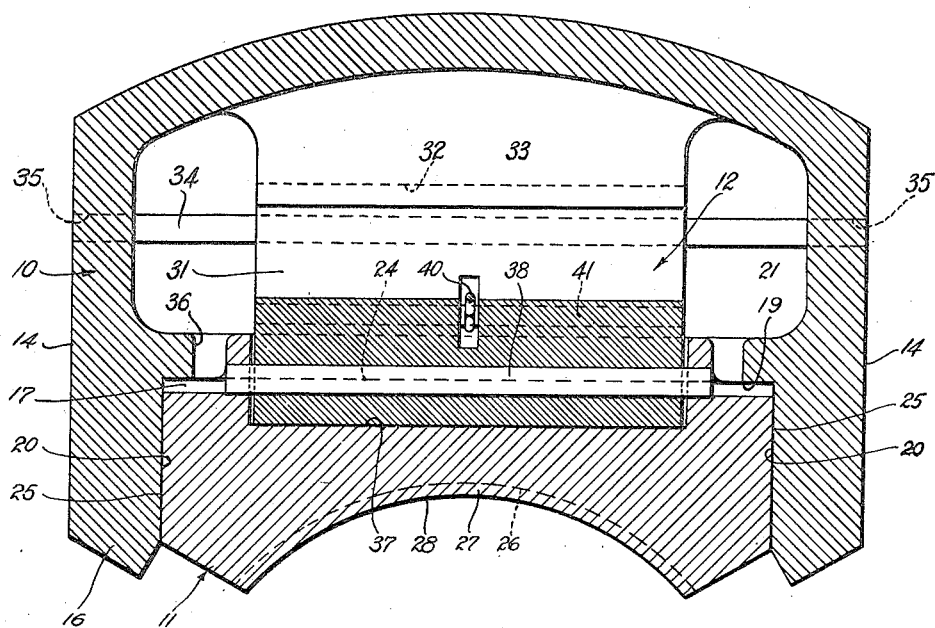
Figure 4:
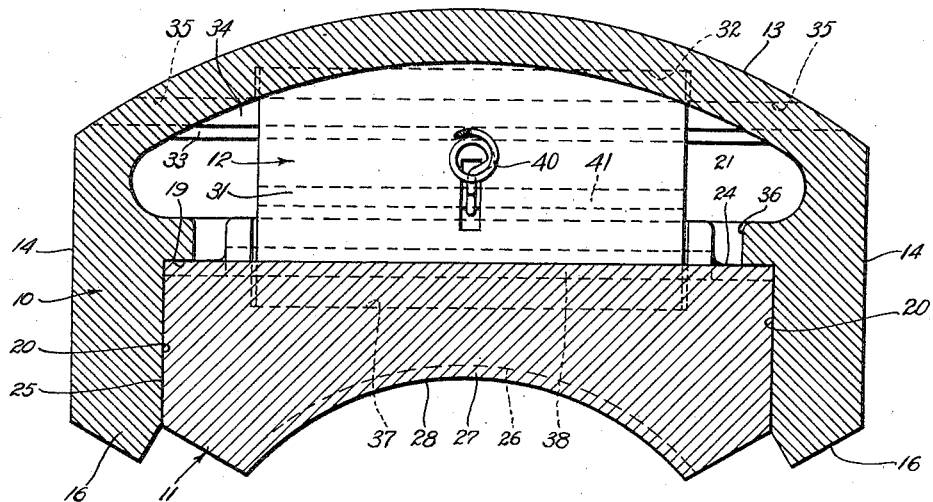

The various objects and features of the invention will be better and more fully understood from the following detailed description of a typical preferred form and application of the invention throughout which description reference may be made to the accompanying drawings, in which:

Fig. 1 is a top or plan view of a set of slips of the present invention arranged in the spider or bushing of a rotary table. Fig. 2 is an enlarged vertical detailed sectional view taken substantially as indicated by line 2—2 on Fig. 1 showing the pipe and bushing in broken lines and Figs. 3 and 4 are enlarged horizontal detailed sectional views taken as indicated by lines 3—3 and 4—4, respectively, on Fig. 2.

The slips of the present invention are adapted to be arranged in the spider or bushing of a rotary table to support a pipe or string of pipe when breaking out and making up well drilling strings, etc. In the drawings we have illustrated the invention embodied in a set of three slips S arranged in the opening O of a spider or bushing B of a rotary table. The opening O is tapered downwardly and inwardly and in accordance with the usual practice is round in cross-section. It is to be understood that the invention may be designed for use in sets of two, four or more slips and for use in spiders and bushings of various characters. As the several slips S are identical we will proceed with a detailed description of one slip, it being understood that such description may apply equally well to the several slips S of the set.

The slip S of the present invention includes, generally, a body 10 adapted to be arranged in the opening O of the bushing B, a pipe engaging liner or member 11 and toggle means 12 actively mounting or supporting the member 11 on the body 10 to grip the pipe P.

The slip body 10 is shaped to seat in the opening O and is preferably proportioned to project upwardly from the upper surface of the bushing B when in operative position in the opening. The major portion 13 of the external or outer surface of the body 10 is convex and is tapered downwardly and inwardly to bear on the wall of the opening O. The upper portion of the outer surface of the body may be cylindrically curved as illustrated in the drawings. The upper and lower ends of the body 10 may be flat and horizontal and the opposite sides 14 of the body are preferably flat and substantially parallel. The opposite sides 14 of the body are provided with faces 15 which are substantially radial relative to the longitudinal axis of the opening O. The radial faces 15 extend inwardly to the inner side of the body 10 and lugs or ribs 16 project from the faces 15 to cooperate with corresponding ribs of adjacent slips.

The inner side of the body 10 is shaped or formed to receive the pipe engaging member 11. In accordance with the invention a recess or vertical channel 17 is provided in the inner side of the body 10 to house or carry the member 11. The channel 17 is preferably comparatively wide and of substantial vertical extent. In the embodiment of the invention illustrated in the drawings the channel 17 extends downwardly from the upper end of the body 10 to an inwardly projecting flange 18 adjacent the lower end of the body. The inner wall 19 of the channel 17 may be flat and vertical and substantially tangential to a circle concentric with the longitudinal axis of the opening O. The opposite side walls 20 of the channel 17 are flat and parallel. The slip body 10 is preferably hollow to be light in weight and to receive or carry the principal parts of the means 12. In the case illustrated in the drawings, the body 10 has a single continuous longitudinal internal cavity or space 21. A suitable handle 22 is pivotally connected with the upper end portion of the body 10 as at 23 to facilitate the ready handling of the slip.

The liner or pipe engaging member 11 is carried by the means 12 to shift inwardly and grip the pipe P upon assuming the weight or a portion of the weight of the pipe. The member 11 may be a simple integral part as illustrated throughout the drawings. The outer side 24 of the member 11 may be flat and vertical to seat against the wall 19 when the member is in its retracted position. The member 11 is provided with flat parallel opposite sides 25 for shiftably or slidably cooperating with the side walls 20 of the channel 17. The inner surface or side of the member 11 is concave being cylindrically concaved and formed to substantially conform to the pipe P. The invention contemplates the provision of teeth or sharpened serrations or ridges on the inner surface of the member 11 to grip the pipe P. It is preferred, however, to provide parts on the inner surface of the member 11 having surfaces of substantial area for contacting the pipe. In the preferred construction illustrated in the drawings the inner surface of the member 11 is provided with a multiplicity of vertically spaced horizontal or circumferential grooves 26 leaving a multiplicity of spaced horizontal or circumferentially extending ridge parts 27. The parts 27 present cylindrically curved or concave surfaces 28 of substantial extent or area for contacting the pipe P. The surfaces 28 are preferably continuous or unbroken and are smooth to effectively engage or grip the pipe without mutilating, cutting or biting into the pipe. The grooves 26 and the parts 27 are flat-sided or rectangular, it being understood that the faces of the parts 27 may be suitably rounded or bevelled if found desirable. The pipe engaging parts 27 may be vertically spaced throughout the inner side of the member 11 and may extend from one side to the other of the member. A retaining plate 29 may be removably attached to the upper end of the body 10 and may have a flange part 30 extending downwardly into the upper portion of the channel 17.

The means 12 mounts or supports the pipe engaging member 11 on the body 10 and is in the nature of a toggle means for actuating or forcing the member 11 into tight holding cooperation with the pipe P when the slips S assume the load or weight of the pipe P. The means 12 includes one or more toggles 31 connecting the member 11 with the body 10. In the particular case illustrated in the drawings there are two vertically spaced toggles 31 pivotally connected with the body 10 and the outer side portion of the member 11. The inner and outer ends of the links or toggles 31 are preferably cylindrically rounded. The outer ends of the toggles 31 pivotally bear in suitably shaped seats 32 in the body 10. The seats 32 may occur in the inner ends of bosses 33. Pins 34, having their end portions carried in openings 35 in the body, extend through openings in the toggles 31 to pivotally connect the toggles with the body. The links or toggles 31 project inwardly from the space 21 through openings 36 in the inner wall of the body. Cylindrically concaved seats 37 are provided in the outer side or surface 24 of the member 11 to receive the inner ends of the toggles 31. Suitable pins 38 pivotally connect the member 11 and toggles 31. The links or toggles 31 are preferably of considerable width and the openings 36 are proportioned to allow for the desired pivotal movement of the toggles 31 and the required motion of the member 11. The parts are related so that the toggles 31 are adapted to engage the lower walls of the openings 36 to be held against further downward movement before reaching a horizontal position so that the pipe engaging member 11 cannot be locked or set in a projecting actuated position. When a load is imposed on the member 11 the force is transmitted through the toggles 31 to the body 10 and causes the links or toggles to pivot downwardly and inwardly to tightly force the member 11 against the pipe P.

Means may be provided for normally holding the pipe engaging member 11 in its retracted position and for returning or for aiding in returning the member to its retracted position after use. Springs 40 are connected with the body 10 and toggles 31 to normally urge the member 11 to the retracted position illustrated throughout the drawings. The springs 40 may be suitable spiralled springs and may be connected with the body 10 and toggles 31 by pins 41 in the manner illustrated in the drawings. The springs 40 are sufficiently strong to normally hold the pipe engaging member in its retracted position in engagement with the wall 19 of the channel 17. The invention may include means for adjusting or setting the member 11 in position to properly and effectively cooperate with pipes of various diameters. A set screw or adjusting screw 42 may be threaded through an opening in the retaining plate 29 and part 30 to cooperate with the upper end of the member 11. The screw 42 may be threaded downwardly to limit the upward movement of the member 11 and stop it in positions to properly cooperate with pipe of different diameters. It will be apparent how the setting or adjustment of the screw 42 may determine the position that the slips S may assume in the opening O when the slips are actively cooperating with a pipe.

It is believed that the operation of the slips provided by this invention will be readily understood from the foregoing detailed description. Upon a slip S being arranged or inserted in the opening O to cooperate with a pipe P the parts 27 on the inner side of the member 11 of the slip engage the pipe while the tapered external surface 13 of the body is adapted to cooperate with the tapered wall of the opening. As described above the springs normally hold the member 11 in the retracted position. Engagement of the member 11 with the pipe P during the arrangement or insertion of the slip in the opening O merely tends to move or shift the pipe gripping member to its retracted position. When the several slips S have been inserted in the opening O the weight of the pipe or the string of pipe may be imposed on the slips. The weight of the pipe P coming on the members 11 of the slips causes the members to shift downwardly. This downward shifting of the members 11 is accompanied by a downward and inward pivoting of the links or toggles 31, it being understood that the force or weight is transmitted from the members 11 to the body 10 by the toggles 31. The downward and inward pivoting of the toggles 31 forces the members 11 into tight gripping and holding cooperation with the pipe P. It is believed that it will be understood how the members 11 are tightly forced against the pipe P by the action of the links or toggles 31.

The parts 27 having the large smooth faces 28 for contacting with the pipe do not cut into or otherwise injure the pipe. The action of the toggles 31 causes the members 11 to be held inwardly against the pipe with such force that the broad or extensive surfaces 28 are effective in holding and gripping the pipe. Upon the pipe P being raised the engagement of the parts 27 with the pipe causes the members 11 to shift upwardly. This upward shifting of the members 11 relative to the slip body 10 is accompanied by outward movement caused by the upward and outward pivoting of the toggle links or toggles 31. The springs 40 may aid in retracting the members 11. The gripping or pipe engaging members 11 are quickly and automatically freed from the pipe P allowing the slips S to be easily removed from the opening O. The pipe engaging members 11 may be removed for replacement by detaching the retaining plate 29 and cutting out or driving out the pins 34 or 38 to free the members from the bodies 10. The members 11 may be replaced by pipe engaging members formed to cooperate with pipe of different diameters. The slips of the present invention are simple and convenient to handle and are particularly effective in operation.

Having described only typical forms and applications of our invention, we do not wish to be limited or restricted to the specific forms and applications herein set forth, but wish to reserve to ourselves any modifications or variations that may appear to those skilled in the art or fall within the scope of the following claims.

Having described our invention, we claim:

1. A slip of the character described including a body, a pipe engaging member, and a toggle connecting the member with the body operable to cause inward movement of the member upon the member assuming a load.

2. A slip of the character described including, a body, a member at the inner side of the body for engaging a pipe, and means connecting the member with the body operable to force the member inwardly relative to the inner side of the body upon assuming a load.

3. A slip of the character described including a body, a member at the inner side of the body for engaging a pipe, and means connecting the member with the body to move inwardly relative to the inner side of the body upon assuming a load, said means including a toggle link pivotally connected with the body and member.

4. A slip of the character described including, a body, a member at the inner side of the body for engaging a pipe, and vertically spaced toggles connected with the body and member to cause the member to be moved inwardly when assuming a load.

5. A slip of the character described including, a body, a member at the inner side of the body for engaging a pipe, toggle means for causing the member to move inwardly upon assuming a load, and means yieldingly holding the member in a normal out position.

6. A slip of the character described including a body having a channel in its inner side, a pipe engaging member shiftable longitudinally and laterally in the channel, and means for actuating the member inwardly when a downward force is applied to it including a toggle acting between the body and member.

7. A slip of the character described including a body having a channel in its inner side, a pipe engaging member shiftable longitudinally and laterally in the channel, and means for actuating the member inwardly relative to the wall of the channel when a downward force is applied to it, said means including a toggle supporting the member on the body.

8. A slip of the character described including a body having a seat, a member for engaging pipe at the inner side of the body, and a toggle bearing in the seat and pivotally connected with the member to cause the member to move inwardly when subjected to a downward force.

9. A slip for use in a rotary table including a body for arrangement in the table, a member at the inner side of the body for engaging a pipe, the member having a seat, and a toggle pivotally connected with the body and cooperating with the seat whereby the member moves inwardly when moved downwardly.

10. A slip for use in a rotary table including a body for arrangement in the table, a member at the inner side of the body for engaging a pipe, toggle links connecting the member with the body whereby the member moves inwardly when moved downwardly, and a spring connected between a link and the body normally urging the member upwardly.

11. A slip of the character described including a body, a member at the inner side of the body for engaging a pipe, spaced parts on the member having surfaces of substantial extent for contacting the pipe, and toggle means for moving the member inwardly as it is moved downwardly.

12. A slip for use in a rotary table including a body for arrangement in the table, a pipe gripping member at the inner side of the body, parts on the member having substantially cylindrically concaved surfaces for contacting the pipe, and toggle means for causing the member to move inwardly as it is moved downwardly.

13. A slip for use in a rotary table including a body for arrangement in the table, a pipe gripping member at the inner side of the body, the member having a substantially cylindrically concaved inner side, there being spaced grooves in said inner side leaving parts with relatively smooth surfaces of substantial area for contacting the pipe, and means for causing the member to move inwardly relative to the body upon assuming a load.

14. In a slip of the character described, a pipe gripping member having projecting parts with relatively smooth surfaces of substantial area for contacting the pipe.

15. A slip for use in a rotary table including a body for arrangement in the table, a pipe gripping member at the inner side of the body, toggle means for causing the member to move inwardly as it moves downwardly, yieldable means normally holding the member against downward movement, and means for adjusting the member vertically.

HARRY P. WICKERSHAM.
ERWIN BURNS.